United States Patent
Maruyama

(10) Patent No.: US 6,975,929 B2
(45) Date of Patent: Dec. 13, 2005

(54) DATA RECORDING APPARATUS, DATA RECORDING METHOD, PROGRAM FOR DATA RECORDING AND INFORMATION RECORDING MEDIUM

(75) Inventor: Kazuhiko Maruyama, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/446,138

(22) Filed: May 28, 2003

(65) Prior Publication Data

US 2004/0024525 A1    Feb. 5, 2004

(30) Foreign Application Priority Data

May 29, 2002  (JP) ............................ P2002-156180

(51) Int. Cl.[7] ........................ G01C 21/34; G01C 21/26
(52) U.S. Cl. ........................................ 701/35; 369/21
(58) Field of Search .................... 701/35, 213; 369/21; 342/357.07, 357.13

(56) References Cited

U.S. PATENT DOCUMENTS

| | | | |
|---|---|---|---|
| 4,685,061 A * | 8/1987 | Whitaker ..................... | 701/35 |
| 4,875,167 A * | 10/1989 | Price et al. .................. | 701/35 |
| 4,939,652 A * | 7/1990 | Steiner ........................ | 701/35 |
| 5,046,007 A * | 9/1991 | McCrery et al. ............. | 701/35 |
| 5,337,236 A * | 8/1994 | Fogg et al. ................... | 701/35 |
| 5,550,738 A * | 8/1996 | Bailey et al. ............ | 455/456.5 |
| 5,897,602 A * | 4/1999 | Mizuta ........................ | 701/201 |
| 6,115,655 A * | 9/2000 | Keith et al. .................. | 701/35 |
| 6,301,533 B1 * | 10/2001 | Markow ...................... | 701/35 |
| 6,650,359 B1 * | 11/2003 | Park ........................... | 348/148 |
| 6,741,933 B1 * | 5/2004 | Glass .......................... | 701/213 |
| 2003/0187572 A1 * | 10/2003 | Tengler et al. .............. | 701/201 |

FOREIGN PATENT DOCUMENTS

AU          9947582 A  *  3/2000

* cited by examiner

*Primary Examiner*—Michael J. Zanelli
(74) *Attorney, Agent, or Firm*—Sughrue Mion, PLLC

(57) ABSTRACT

The navigation apparatus is provided with: an operating unit which is used for entering type of use of movement of an automobile; a position-recognition unit which calculates at least a distance traveled by the automobile under the entered type of use; and a control unit which detects starting-point data indicating a starting-point where the automobile starts moving, and ending-point data indicating an ending-point where the automobile stops moving; and which records the calculated distance, the detected starting-point data, and the detected ending-point data on an external recording device according to the entered type of use.

9 Claims, 6 Drawing Sheets

| | | |
|---|---|---|
| STARTING TIME OF RECORDING | 2002/5/20 4:40 (PM) | —TM |
| LATITUDE, LONGITUDE | (2 17' 22.9" E, 48 56' 31.9" N) | —POS |
| ROAD NAME | N46 | —NM |
| NEARBY INTERSECTION NAME | I35 HIGHWAY ENTRANCE | —CR |
| POI | | —PI |
| MODE | PRIVATE USE | —MD |

| | | |
|---|---|---|
| RECORDING TIME | 2002/5/20 8:10 (PM) | —TM |
| LATITUDE, LONGITUDE | (2 13' 26.9" E, 48 40' 1.0" N) | —POS |
| ROAD NAME | NONE | —NM |
| NEARBY INTERSECTION NAME | NONE | —CR |
| POI | HOUSE | —PI |
| MODE | PRIVATE USE | —MD |
| TOTAL DISTANCE TRAVELED | 45 km | —DT |

FIG.5A

| | | |
|---|---|---|
| STARTING TIME OF RECORDING | 2002/5/20 10:40 (AM) | TM |
| LATITUDE, LONGITUDE | (2 13' 26.9"E, 48 40' 1.0"N) | POS |
| ROAD NAME | AVENU DE LUISE | NM |
| NEARBY INTERSECTION NAME | AVENU DE ELISE | CR |
| POI | | PI |
| MODE | BUSINESS USE | MD |

| | | |
|---|---|---|
| RECORDING TIME | 2002/5/20 11:55 (AM) | TM |
| LATITUDE, LONGITUDE | (2 17' 22.9"E, 48 56' 31.9"N) | POS |
| ROAD NAME | NONE | NM |
| NEARBY INTERSECTION NAME | YAMADA INTERSECTION | CR |
| POI | | PI |
| MODE | BUSINESS USE | MD |
| TOTAL DISTANCE TRAVELED | 56km (NORMAL ROADS) | DT |

RST

| | | |
|---|---|---|
| STARTING TIME OF RECORDING | 2002/5/20 1:10 (PM) | TM |
| LATITUDE, LONGITUDE | (2 17' 22.9"E, 48 56' 31.9"N) | POS |
| ROAD NAME | NONE | NM |
| NEARBY INTERSECTION NAME | YAMADA INTERSECTION | CR |
| POI | | PI |
| MODE | BUSINESS USE | MD |

FIG.5D

| | | |
|---|---|---|
| RECORDING TIME | 2002/5/20 1:35 (PM) | TM |
| LATITUDE, LONGITUDE | (2 17' 22.9"E, 48 56' 31.9"N) | POS |
| ROAD NAME | NONE | NM |
| NEARBY INTERSECTION NAME | KAWAGOE INTERCHANGE ENTRANCE | CR |
| POI | KAWAGOE INTERCHANGE ENTRANCE | PI |
| MODE | BUSINESS USE | MD |
| TOTAL DISTANCE TRAVELED | 14km (NORMAL ROADS) | DT |

| | | |
|---|---|---|
| RECORDING TIME | 2002/5/20 2:15 (PM) | TM |
| LATITUDE, LONGITUDE | (2 17' 22.9"E, 48 56' 31.9"N) | POS |
| ROAD NAME | NONE | NM |
| NEARBY INTERSECTION NAME | HONJO KODAMA EXIT | CR |
| POI | HONJO KODAMA EXIT | PI |
| MODE | BUSINESS USE | MD |
| TOTAL DISTANCE TRAVELED | 45km (FREEWAY) | DT |
| FEE | 900YEN | |

| | | |
|---|---|---|
| RECORDING TIME | 2002/5/20 3:00 (PM) | TM |
| LATITUDE, LONGITUDE | (2 13' 26.9"E, 48 40' 1.0"N) | POS |
| ROAD NAME | NONE | NM |
| NEARBY INTERSECTION NAME | HANAZAWA INTERSECTION | CR |
| POI | NONE | PI |
| MODE | BUSINESS USE | MD |
| TOTAL DISTANCE TRAVELED | 139km | DT |

| STARTING TIME OF RECORDING | 2002/5/20 4:40 (PM) | —TM |
|---|---|---|
| LATITUDE, LONGITUDE | (2 17' 22.9" E, 48 56' 31.9" N) | —POS |
| ROAD NAME | N46 | —NM |
| NEARBY INTERSECTION NAME | I35 HIGHWAY ENTRANCE | —CR |
| POI | | —PI |
| MODE | PRIVATE USE | —MD |

| RECORDING TIME | 2002/5/20 8:10 (PM) | —TM |
|---|---|---|
| LATITUDE, LONGITUDE | (2 13' 26.9" E, 48 40' 1.0" N) | —POS |
| ROAD NAME | AVENU DE LUISE | —NM |
| NEARBY INTERSECTION NAME | AVENU DE ELISE | —CR |
| POI | | —PI |
| MODE | PRIVATE USE | —MD |
| TOTAL DISTANCE TRAVELED | 135 km | —DT |

DATA RECORDING APPARATUS, DATA RECORDING METHOD, PROGRAM FOR DATA RECORDING AND INFORMATION RECORDING MEDIUM

BACKGROUND OF THE INVENTION

1. Field of the Invention

The present invention relates to a data-recording apparatus, data-recording method, data-recording program and data-recording medium, and more particularly to a data-recording apparatus that is installed in a moving object, a data-recording method that is executed by the data-recording apparatus, a data-recording program for the data-recording apparatus and a data-recording medium on which the data-recording program is recorded.

2. Description of the Related Art

In recent years, installation of a navigation apparatus in a moving object such as an automobile for guiding the movement of the moving object has become widespread and common.

When doing this, in a conventional navigation apparatus, the roads that have been traveled up to the present position have been displayed on a display apparatus as travel history.

However, in the conventional travel history display, only marks indicating movement over roads that have been traveled in the past were displayed, regardless of the type of use or objective of that movement.

Therefore, in the display process for displaying this conventional travel history, it was not possible to manage the travel history according to type of use or objective.

SUMMARY OF THE INVENTION

Thereupon, the present invention has been made in view of the above-described points in problem and has an object to provide: a data-recording apparatus that is capable of managing the travel history of a moving object according to the objectives of the travel; a data-recording method that is executed by the data-recording apparatus; a data-recording program for the data-recording apparatus and a data-recording medium on which the data-recording program is recorded.

The above object of the present invention can be achieved by a data-recording apparatus. The data-recording apparatus is provided with: an input device that is used for entering the type of use of movement of a moving object; a calculation device of calculating at least the distance traveled by said moving object under said entered type of use; and a recording device of recording at least said calculated distance of travel on a recording medium according to said type of use.

According to the data-recording apparatus, since the type of use is entered and at least the distance traveled by the moving object during the input use is calculated and the calculated travel distances are recorded on the recording medium according to type of use, the recorded travel distances according to use can be used for calculating and billing the necessary expenses according to use.

In one aspect of the data-recording apparatus, said recording medium is a portable recording medium.

According to this aspect, since the recording medium is a portable recording medium, the recording medium in which travel distances are recorded according to use can be mounted to a personal computer or the like, and the personal computer can calculate and process the necessary expenses according to use.

In another aspect of the data-recording apparatus, the data-recording apparatus further comprising: a temporary-stop detection device of detecting whether or not recording of said travel distance is temporarily stopped; and a restart-usage detection device of detecting whether or not recording is started again with the same type of use as before said temporary stop; and said recording device calculates the distance traveled to a temporary stopping point when travel is temporarily stopped and starts recording the distance again under the same type of use as before the temporary stop; or starts recording a new travel distance under the different type of use as before the temporary stop, that is separate from the travel distance recorded up until the time the temporary stop occurred.

According to this aspect, when travel is temporarily stopped and then recording is started again under the same type of use as before the temporary stop, the distance traveled to the temporary stopping point is calculated and recording of the travel distance starts again, or when recording is started again under a type of use that is different than that before the temporary stop, recording of a new travel distance that is separate from the travel distance recorded up to the temporary stop begins, so even when the type of use changes during movement, it is possible to accurately calculate the travel distances.

In further aspect of the data-recording apparatus, the data-recording apparatus further comprising: a starting-point-data-recording device that detects starting-point data of movement, which indicates the point where said moving object starts moving, and records it on said recording medium; and an ending-point-data-recording device that detects ending-point data of movement, which indicates the point where said moving object stops moving, and records it on said recording medium.

According to this aspect, since starting-point data that indicates the point where the moving object starts moving is detected and recorded in the recording medium, and ending-point data that indicates the point where the moving object stops moving is detected and similarly recorded in the recording medium, it is possible to calculate the bill for travel expenses in more detail.

In further aspect of the data-recording apparatus, said recording device writes over said travel distance at least once every time a preset length of time elapses and records it on said recording medium.

According to this aspect, since the travel distance is written over and recorded after at least a preset length of time, it is possible to prevent losing the travel distance to be recorded in the event the power to the data-recording apparatus is accidentally turned OFF, as well as it is possible to conserve recording space on the recording medium for recording the travel distance.

In further aspect of the data-recording apparatus, said type of use is either 'Private Use' or 'Business Use'.

According to this aspect, since the type of use is either 'Business Use' or 'Private Use', it is possible to differentiate between business use and private use and calculate the required expenses based on the type of travel.

The above object of the present invention can be achieved by a data-recording method. The data-recording method is provided with: an input process of entering the type of use of movement of a moving object; a calculation process of calculating at least the distance traveled by said moving object under said entered type of use; and a recording process of recording at least said calculated distance of travel on a recording medium according to said type of use.

According to the data-recording method, since the type of use is entered and at least the distance traveled by the moving object during the input use is calculated and the calculated travel distances are recorded on the recording medium according to type of use, the recorded travel distances according to use can be used for calculating and billing the necessary expenses according to use.

The above object of the present invention can be achieved by a computer data signal embodied in a carrier wave. The computer data signal represent a sequence of instructions, which executed by a computer included in said terminal apparatus according to claim 1, the instructions cause the computer to function as: an input device that can be used for entering the type of use of movement of a moving object; a calculation device of calculating at least the distance traveled by said moving object during said entered type of use; and a recording device of recording at least said calculated distance of travel on a recording medium according to said type of use.

According to the computer data signal, the computer reads out the computer data signal from the carrier wave and the computer functions in such a manner that the type of use is entered and at least the distance traveled by the moving object during the input use is calculated and the calculated travel distances are recorded on the recording medium according to type of use. Therefore, the recorded travel distances according to use can be used for calculating and billing the necessary expenses according to use.

The above object of the present invention can be achieved by an information recording medium. The information recording medium records a program for a data-recording so as to be readable by a computer included in said data-recording apparatus according to claim 1, wherein said program allows said computer to function as: an input device that can be used for entering the type of use of movement of a moving object; a calculation device of calculating at least the distance traveled by said moving object during said entered type of use; and a recording device of recording at least said calculated distance of travel on a recording medium according to said type of use.

According to the information recording medium, the computer reads out the program from the information recording medium and it functions in such a manner that the type of use is entered and at least the distance traveled by the moving object during the input use is calculated and the calculated travel distances are recorded on the recording medium according to type of use. Therefore, the recorded travel distances according to use can be used for calculating and billing the necessary expenses according to use.

BRIEF DESCRIPTION OF THE DRAWINGS

FIG. 4A is a drawing showing an example of the origin data.

FIG. 4B is a drawing showing an example of the destination data.

FIG. 5A is a drawing showing an example of the origin data.

FIG. 5B is a drawing showing an example of the destination data.

FIG. 5C is a drawing showing an example of new origin data.

FIG. 5D is a drawing showing an example of mid-point data.

FIG. 5E is a drawing showing an example of mid-point data.

FIG. 5F is a drawing showing an example of destination data.

FIG. 6A is a drawing showing an example of the origin data.

FIG. 6B is a drawing showing an example of the destination data.

DESCRIPTION OF THE PREFERRED EMBODIMENTS

The preferred embodiments of the invention will be explained based on the drawings.

The embodiment explained below is an embodiment of where the invention is applied to an automobile navigation apparatus that is installed in a moving body, which in this case is an automobile, and that guides the movement of the automobile.

Figure 1:
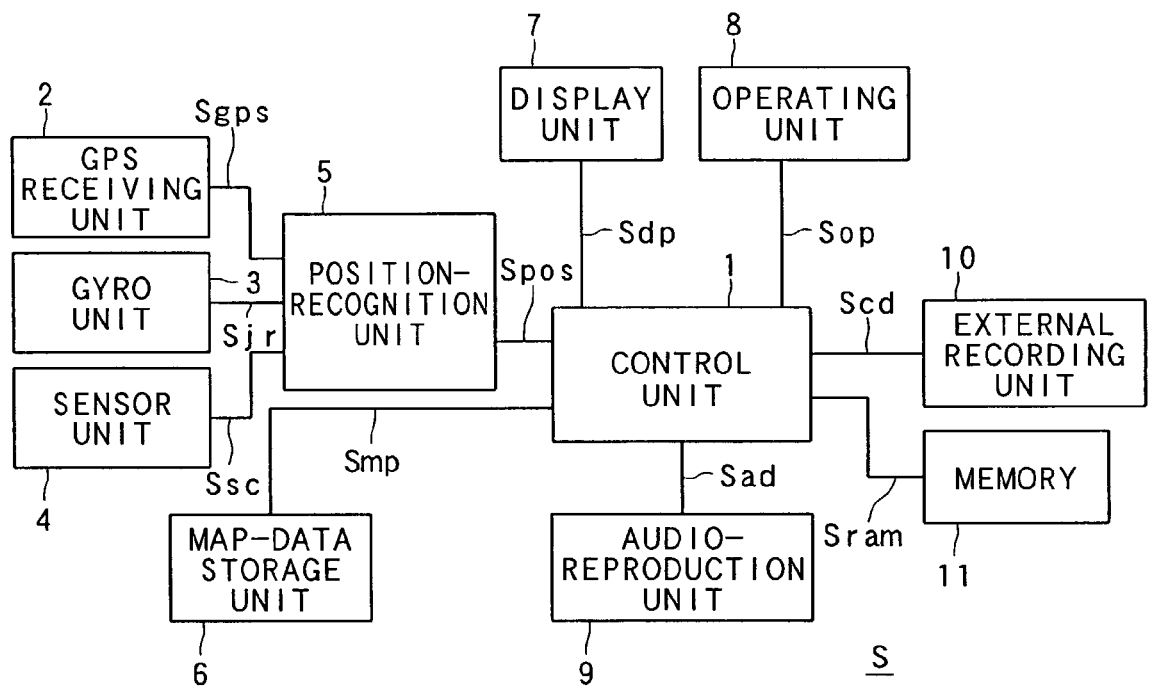
FIG. 1 is a block diagram showing the main construction of the navigation apparatus of an embodiment of the invention.

First, the main construction and overall operation of the navigation apparatus of this embodiment will be explained using FIG. 1. FIG. 1 is a block diagram showing the main construction of the navigation apparatus.

As shown in FIG. 1, the navigation apparatus S of this embodiment comprises: a control unit 1 that functions as a recording device, a temporary-stop detection device, a restart-usage detection device, a starting-point-data detecting device and an ending-point-data detecting device; a GPS (Global Positioning System) receiving unit 2; a gyro unit 3; sensor unit 4, position-recognition unit 5 as a calculation device; map-data storage unit 6; display unit 7; operating unit 8 as an input device; audio-reproduction unit 9; an external recording device 10 as a recording medium; and memory 11.

Next, the overall operation will be explained.

First, the GPS receiving unit 2 receives a navigation signal from the GPS satellite, which is a stationary satellite up in space, and generates a GPS signal Sgps that corresponds to the received results and outputs that signal to the position-recognition unit 5.

At the same time, the gyro 3 detects changes in the direction of movement of the automobile in which the navigation apparatus S is installed, and generates a direction-of-movement signal Sjr corresponding to the detected changes and outputs that signal to the position-recognition apparatus 5.

Furthermore, the sensor unit 4 mainly detects changes in the direction of movement of the automobile in the vertical plane, or in other words, detects whether the automobile is going up or going down a hill and detects that angle, then it generates a sensor signal Ssc that corresponds to the detected angle and outputs it to the position-recognition unit 5.

Based on the GPS signal Sgps, direction-of-movement signal Sjr and sensor signal Ssc, the position-recognition unit 5 detects the current position of the automobile by independent navigation using the position of the automobile indicated by the GPS signal Sgps for correction, and generates a position signal Spos that corresponds to the detected current position and outputs it to the control unit 1.

On the other hand, the map-data storage unit 6 stores map data that corresponds to the various maps to be displayed on the display unit 7 and that can be read at various scales, and when necessary, it outputs a map signal Smp to the control unit 1.

Also, the controls required when using the navigation apparatus S to guide travel are executed by the operator using the operating unit 8, and the operating unit 8 generates a control signal Sop based on the executed operation and outputs it to the control unit 1. Required controls include controls for setting the modes of this embodiment as will be described later.

Based on the control signal Sop from the operating unit 8, the control unit 1 uses the position signal Spos from the position-recognition unit 5 to recognize the current position of the automobile, and together with outputting the map corresponding to that recognized current position, it performs the necessary guidance process. When doing this, the map and current position to be displayed are output to the display unit 7 as display signals Sdp. Furthermore, the data required for executing the guidance process are output to and stored temporarily in the memory as a memory signal Sram, and when necessary the data are read and supplied for guidance process. Moreover, the audio data, such as audio instructions that are given to the operator in the guidance process, are output from the control unit 1 to the audio-reproduction unit 9, where the audio-reproduction unit 9, comprising an amp and speaker, play the audio instructions inside the automobile.

While performing the guidance process, the control unit 1 also performs the process for generating the travel history of this embodiment to be described later. That travel history is output to the external recording unit 10 as a history signal Scd. Here, the external recording unit 10 comprises a card-type recording apparatus that can be removed and carried, and it records the contents of the history signal Scd that is output to it.

The external recording unit 10 that records the history signal Scd can be removed from the navigation apparatus S with the recorded history signal Scd and then mounted to another personal computer or the like and the personal computer can be used to read the history signal Scd. Also, the travel history that is contained in the read history signal Scd can be supplied to the necessary history-management processes in the personal computer.

Figure 2:
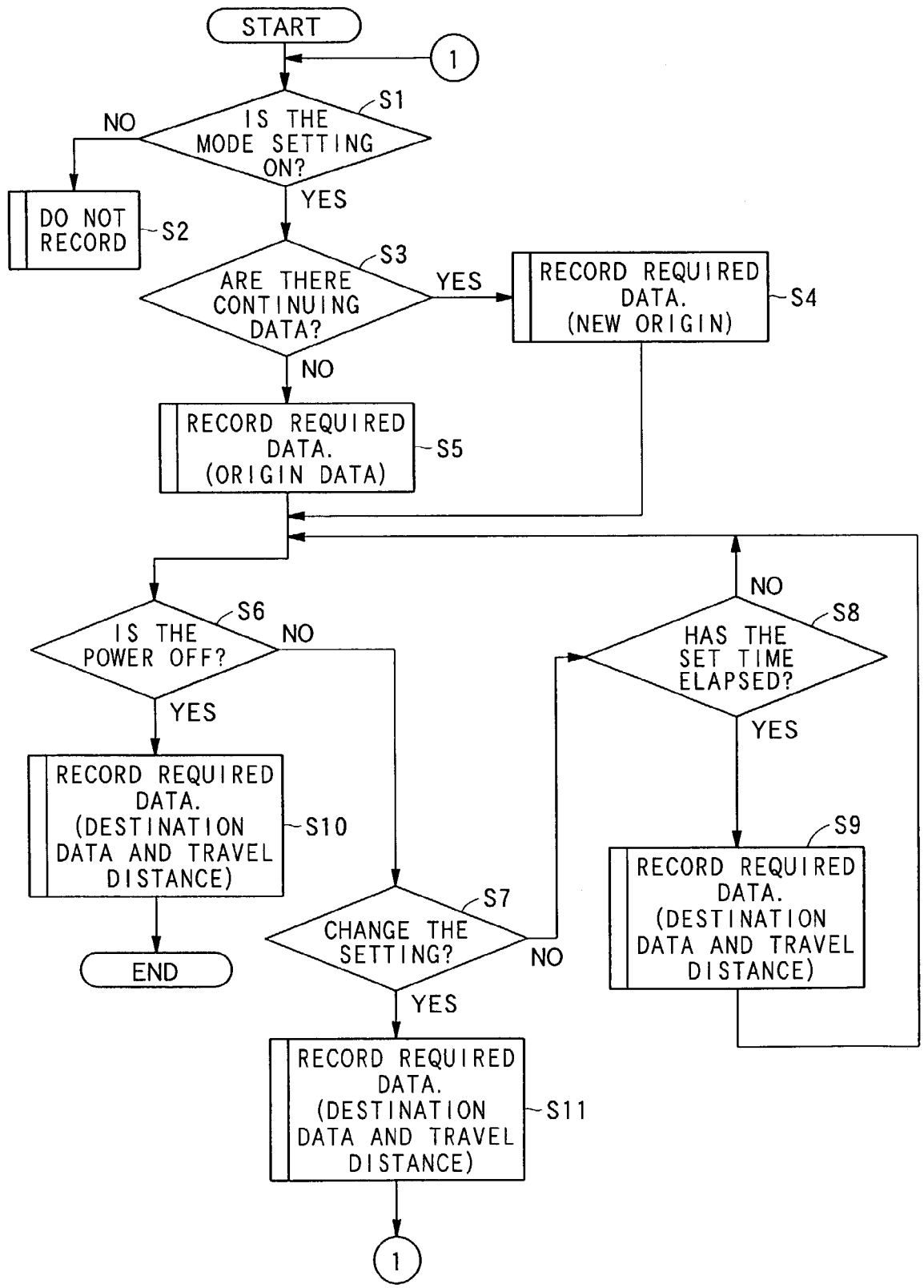
FIG. 2 is a flowchart showing the overall process of generating the travel history of an embodiment of the invention.
Figure 3:
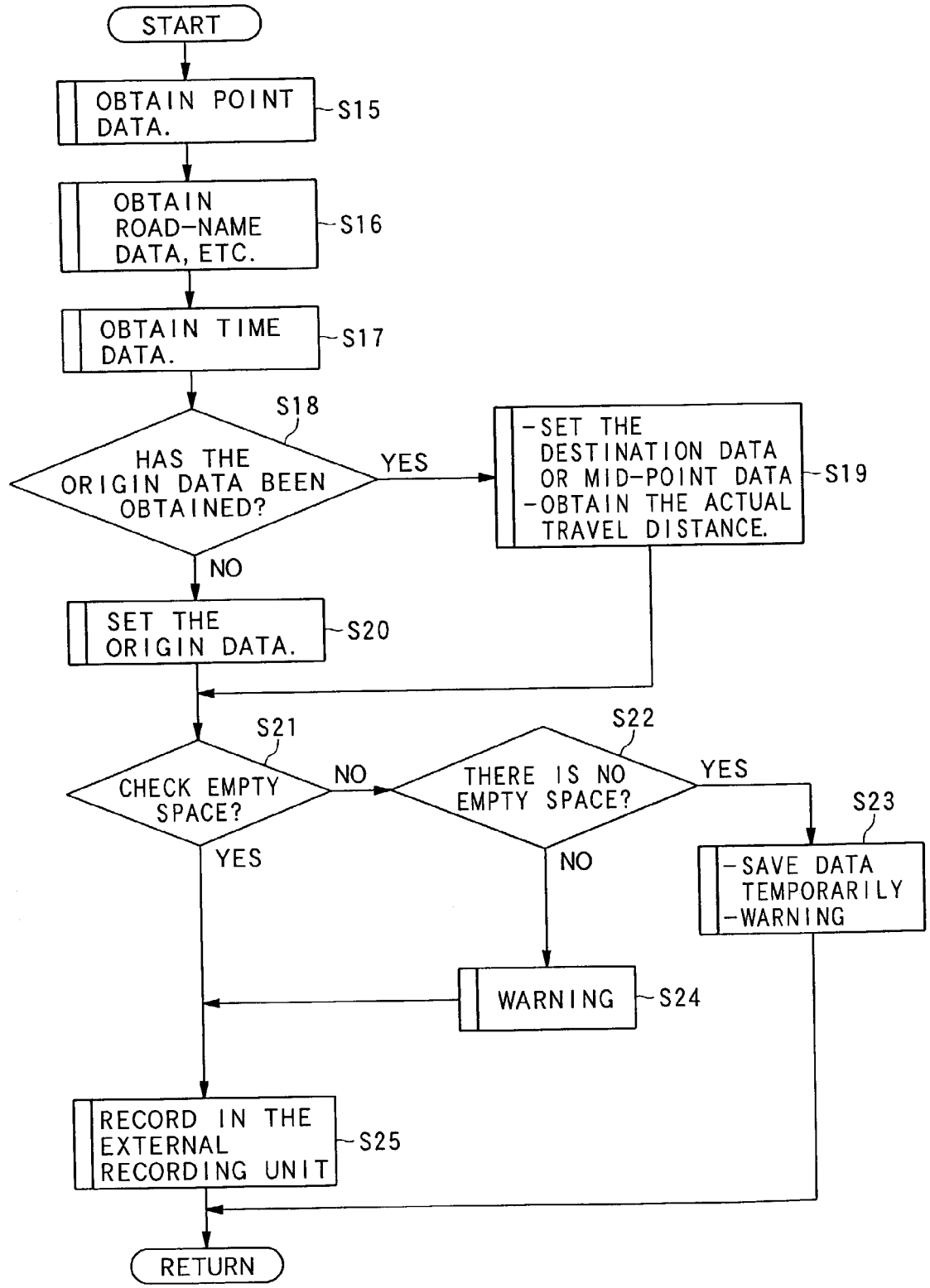
FIG. 3 is a flowchart showing details of the process of generating the travel history of an embodiment of the invention.

Next, the process for generating the travel history of this embodiment will be explained using FIG. 2 to FIG. 6. FIG. 2 and FIG. 3 are flowcharts showing the process for generating the travel history, and FIG. 4 to FIG. 6 are drawings showing various examples of the contents of the travel history generated by the travel-history generation process.

First, the overall configuration of the travel-history generation process of this embodiment will be explained using FIG. 2 and FIG. 3.

The travel-history generation process is executed mainly by the control unit 1 as one of the sub-routines of the main routine corresponding to the guidance process.

As shown in FIG. 2, in the travel-history generation process of this embodiment, when the power to the navigation apparatus S is turned ON, a timer (not shown in the figure) inside the control unit 1 starts a clock from the time that the power is turned ON, and the control unit 1 determines whether or not a mode has been set by the operating unit 8 (step S1). Here, the modes indicate the type of use for moving the automobile in which the navigation apparatus S is installed, and for the navigation apparatus S of this embodiment, the modes that can be set are 'Private Use' and 'Business Use'.

When it is determined in the judgment of step S1 that a mode has not been set (step S1: No), neither the travel-history generation process or recording process are executed (step S2), and the process moves as is to the main routine of the guidance process.

On the other hand, when it is determined in the judgment of step S1 that either the 'Private Use' or 'Business Use' mode has been set (step S1: Yes), the process checks the travel history in the external recording unit 10, which has been recorded up to this point when the power to the navigation apparatus S was turned ON, and determines whether there is travel history recorded for the same mode that was set for the current process in step S1 (step S3).

When it is determined that there is no previous travel history for the same mode that was set this time (step S3: No), new travel is started according to a set mode (step S1), and the current position of the automobile at that time is recorded in the external recording unit 10 as the origin data (step S5).

Here, the data recorded in the external recording unit 10 as origin data are: time data indicating the current time as the starting time for recording the travel history; position data indicating the current position at the start of recording; road-name data such as the names of roads near the current position; intersection-name data such as the names of intersections near the current position; registered-point data (hereafter registered-point data will called POI data) indicating whether or not the current position corresponds to a pre-registered point data (for example, home or place of work); and mode data indicating the mode set at that time.

On the other hand, when it is determined in step S3 that there is previous travel history in the external recording unit 10 for the same mode that is currently set (step S3: Yes), travel will begin again under the same mode, and the current position of the automobile at that time will be recorded in the external recording unit 10 as new-origin data (step S4).

Here, the data recorded in the external recording unit 10 as new-origin data are the same as that for the origin data described above and include: time data, position data, road-name data, intersection-name data, POI data and mode data.

After the origin data or new-origin data are recorded, next the process checks whether or not power to the navigation apparatus S has stopped due to stopping the automobile and removing the ignition key (step S6). When it is determined that the automobile is still moving (step S6: No), the process determines whether or not an operation has been executed from the operating unit 8 to change the mode (step S7). Also, when it is determined that the automobile is still moving and no operations have been executed to change the mode (step S7: No), next the process checks the timer clock inside the control unit 1 to determine whether or not a preset length of time (for example one minute) has elapsed (step S8), and when it is determined that the set length of time has not elapsed (step S8: No), the clock continues as is and the process returns to step S6, however when it is determined that the set length of time has elapsed (step S8: Yes), the current position of the automobile when at the instant the time elapsed is recorded in the external recording unit 10 as the destination data (step S9).

Here, the data recorded in the external recording unit 10 as destination data are: time data indicating the time when the set time length elapsed; position data indicating the current position of the automobile when the time elapsed; road-name data such as names of roads near that current position; intersection-name data such as names of intersections near that current position; corresponding POI data; mode data indicating the mode set at that time; and travel-distance data indicating the actual distance traveled from the point recorded as the origin data.

After the required data are recorded in the external recording unit 10 as destination data, the process returns again to step S6, and the operation described above is repeated.

As can be clearly seen from the process of steps S1 to S9 explained above, during movement of a normal automobile in which the mode is changed, after the process of steps S1 to S5 has finished, the process of steps S6-->S7-->S8-->S6 is repeated, or the process of steps S6-->S7-->S8-->S9-->S6 is repeated.

On the other hand, when it is determined in the process of step S7 that an operation has been executed to change the mode (step S7: Yes), the current position of the automobile at the time the mode is changed is recorded in the external recording unit 10 as the destination data (step S11).

Here, the data that are recorded in the external recording unit 10 as destination data in step S11 are the same as in step S9 and include: time data indicating the time when the change occurred; position data indicating the current position when the change occurred; road-name data such as names of roads near that current position; intersection-name data such as names of intersections near that current position; corresponding POI data; mode data indicating the mode set at that time; and travel-distance data indicating the actual distance traveled from the point recorded as the origin data.

Also, after the required destination data have been recorded (step S11), the process returns as is to step S1 and the process described above is repeated for the changed mode.

On the other hand, when it is determined in the process of step S6 that the power supplied to the navigation apparatus S has been cut (step S6: Yes), the current position of the automobile at the time the power was cut is recorded in the external recording device 10 as the destination data (step S10).

Here, the data recorded in the external recording unit 10 as destination data in step S10 is the same as that recorded in step S9 or S11 and includes: time data indicating the time when the power was cut; position data indicating the current position when the power was cut; road-name data such as names of roads near that current position; intersection-name data such as names of intersections near that current position; corresponding POI data; mode data indicating the mode set at that time; and travel-distance data indicating the actual distance traveled from the point recorded as the origin data.

After the required destination data have been recorded (step S10), the process returns to the original main routine.

Next, the recording processes for the origin data or destination data that are executed in the steps S4, S5, S9, S10 or S11 described above will be explained using FIG. 3.

In the recording processes, common to steps S4, S5, S9, S10 and S11, first, the control unit 1 obtains the current position data of the automobile from the position-recognition unit 5 (step S15), then the control unit 1 obtains road-name data, intersection-name data and POI data corresponding to the current position at that time from the map-data storage unit 6 (step S16), and then the control unit 1 obtains the current time data from the position-recognition unit 5 (step S17).

Also, the process determines whether or not the origin data or new-origin data has already been obtained in step S4 or step S5 (step S18), and when the data have already been obtained (step S18: Yes) then step S9, S10 or S11 is currently being executed and the data obtained in steps S15 to S17 are set as destination data or mid-point data and the total distance traveled from the origin is obtained by using the GPS signal Sgps that is received by the position-recognition unit 5 (step S19).

On the other hand, when it is determined in the judgment of step S18 that the origin data or new-origin data has not yet been obtained (step S18: No), then currently step S4 or S5 is being executed and the data obtained in steps S15 to S17 are set as origin data or new-origin data (step S20).

Next, whether there is empty space in the recording area of the external recording unit 10 is checked (step S21), and when there is empty space (step S21: Yes), the data set as origin data, new-origin data or the destination data are recorded in the external recording unit 10 (step S25), and the process moves to the process corresponding to that shown in FIG. 2.

On the other hand, when it is determined in step S21 that there is not the necessary amount of empty space in the external recording unit 10 (step S21: No), then the recording area is checked to determine whether or not there is no space at all (step S22), and when there is absolutely no empty space (step S22: Yes), the operator is notified of this by a warning that is displayed on the display unit 7 (step S24), and the process moves to the process corresponding to that shown in FIG. 2.

Furthermore, when it is determined in the judgment of step S22 that there is not enough empty space (step S22: Yes), the data that are set as origin data, new-origin data or destination data are temporarily stored in the memory 11 and the operator is notified of this by a warning that is displayed on the display unit 7 (step S23), and the process moves to the process corresponding to that shown in FIG. 2.

In the process of step S9, S10 or S11 described above, except for the required mid-point data, the destination data after a set amount of time is written over the previous destination data and recorded in the external recording unit 10.

Next, concrete examples of the data recorded in the external recording unit 10 as the automobile actually moves will be given using the FIG. 4 to FIG. 6.

First, as a first example of traveling in the 'Private Use' mode from a completely new origin until arriving at a destination without any stops will be explained using FIG. 4.

First, after the automobile starts moving at the origin, the origin data ST shown in FIG. 4A is recorded in the external recording unit 10 (see FIG. 2, step S5).

The data recorded in the external recording unit 10 as origin data ST at this time include time data TM, position data POS, road-name data NM, intersection-name data CR, POI data PI and mode data MD, and the values are as shown in FIG. 4A.

Also, when the automobile reaches the destination without stopping and the power to the navigation apparatus S is turned OFF, the destination data OJ as shown in FIG. 4B is recorded in the external recording unit 10 (see FIG. 2, step S10).

The data recording in the external recording unit 10 as destination data OJ at this time include time data TM, position data POS, road-name data NM, intersection-name data CR, POI data PI, mode data MD and distance data DT, and the values are as shown in FIG. 4B.

Next, as a second example of traveling in the 'Business Use' mode from a completely new origin, stopping at a point along the route, then starting again on 'Business Use' by way of the freeway until reaching the destination, then changing the mode to 'Private Use' and driving the automobile in the 'Private Use' mode from that origin until arriving at a destination is explained using FIG. 5 and FIG. 6.

First, after the automobile starts moving at the origin in the 'Business Use' mode, the origin data ST shown in FIG. 5A are recorded in the external recording unit 10 (see FIG. 2, step S5).

Here, the data recorded in the external recording unit 10 as origin data ST include time data TM, position data POS, road-name data NM, intersection-name data CR, POI data PI and mode data MD, and the values are as shown in FIG. 5A.

After starting, when the automobile stops at a point along the route, destination data OJ as shown in FIG. 5B are recorded in the external recording unit 10 as mid-point data (see FIG. 2, step S10).

The data recorded at this time in the external recording unit 10 as destination data are time data TM, position data POS, road-name data NM, intersection-name data CR, POI data PI, mode data MD and travel-distance data DT, and the values are as shown in FIG. 5B. Here, the travel-distance data is the distance traveled in the 'Business Use' mode from the origin to the mid point along the route where the automobile stopped.

Next, when the automobile starts moving again from the mid point as the new origin, new-origin data RST as shown in FIG. 5C is recorded in the external recording unit 10 (see FIG. 2, step S4).

The data recorded at this time in the external recording unit 10 as new-origin data RST include time data TM, position data POS, road-name data NM, intersection-name data CR, POI data PI and mode data MD, and have the values as shown in FIG. 5C.

Also, after the automobile starts again, even if the automobile does not stop at the necessary mid point, that destination data OJ shown in FIG. 5D or 5E is stored and recorded in the external recording unit 10 as mid-point data (see FIG. 2, step S9).

The data recorded at this time in the external recording unit 10 as destination data OJ include time data TM, position data POS, road-name data NM, intersection-name data CR, POI data PI, mode data MD and travel-distance data DT, and have values as shown in FIG. 5D or 5E. Here the travel-distance data DT indicates the distance traveled in the 'Business Use' mode from the origin to the each mid point. Also, as shown in FIG. 5E, after traveling along the freeway, fee data FE indicating the required fee can also be recorded.

Finally, after the destination has been reached in the 'Business Use' mode and the power to the navigation apparatus S has been turned OFF, the destination data OJ shown in FIG. 5F is recorded in the external recording unit 10 (see FIG. 2, step S10).

The data recorded at this time in the external recording unit 10 as destination data OJ include time data TM, position data POS, road-name data NM, intersection-name data CR, POI data PI, mode data MD and travel-distance data DT, and have values as shown in FIG. 5F. Here the travel-distance data DT indicates the total distance traveled from the origin corresponding to the origin shown in FIG. 5A.

Next, a mode change is executed (FIG. 2, step S7) and the mode is changed from 'Business Use' to 'Private Use', and the current position after the change is recorded in the external recording unit 10 as destination data (see FIG. 2, step S11). Also, after the automobile starts moving again in the 'Private Use' mode, the origin data ST shown in FIG. 6A are recorded in the external recording unit 10 (see FIG. 2, step S5).

The data recorded at this time in the external recording unit 10 as origin data ST include time data TM, position data POS, road-name data NM, intersection-name data CR, POI data PI and mode data MD, and have values as shown in FIG. 6A.

After the automobile reaches the destination in the 'Private Use' mode without stopping and the power to the navigation apparatus S is turned OFF, the destination data shown in FIG. 6B are recorded in the external recording unit 10 (see FIG. 2, step S10).

The data recorded at this time in the external recording unit 10 as destination data OJ include time data TM, position data POS, road-name data NM, intersection-name data CR, POI data PI, mode data MD and travel-distance data DT, and have values as shown in FIG. 6B. The travel-distance data DT here indicate the total distance traveled from the origin corresponding to the origin data shown in FIG. 6A.

As explained above, with the operation of the navigation apparatus of this embodiment, the type of use is entered and at least the distance traveled by the automobile during the input use is calculated and the calculated travel distances are recorded in the external recording unit 10 according to type of use, so the recorded travel distances according to use can be used for calculating and billing the necessary expenses according to use.

Since the external recording unit 10 can be carried, the external recording unit 10 in which travel distances are recorded according to use can be mounted to a personal computer or the like, and the personal computer can calculate and process the necessary expenses according to use.

Moreover, when travel is temporarily stopped and then recording is started again under the same type of use as before the temporary stop, the distance traveled to the temporary stopping point is calculated and recording of the travel distance starts again, or when recording is started again under a type of use that is different than that before the temporary stop, recording of a new travel distance that is separate from the travel distance recorded up to the temporary stop begins, so even when the type of use changes during movement, it is possible to accurately calculate the travel distances.

Furthermore, since origin data that indicates the point where the automobile starts moving is detected and recorded in the external recording unit 10, and destination data that indicates the point where the automobile stops moving is detected and similarly recorded in the external recording unit 10, it is possible to calculate the bill for travel expenses in more detail.

Also, since the travel distance is written over and recorded after at least a preset length of time, it is possible to prevent losing the travel distance to be recorded in the event the power to the navigation apparatus S is accidentally turned OFF, as well as it is possible to conserve recording space on the external recording unit 10 for recording the travel distance.

Moreover, since the type of use is either 'Business Use' or 'Private Use', it is possible to differentiate between business use and private use and calculate the required expenses based on the type of travel.

Furthermore, in the embodiment described above, the various data are recorded directly in the external recording unit 10, however, besides this, the data could be stored temporarily in memory 11, and after processing is finished, the data could be recorded all together at one time in the external recording unit 10 and thus making it possible to improve efficiency of the process. In this way, in the case that data could not be recorded to the external recording unit 10 because the power was accidentally turned OFF, the data could be recorded to the external recording unit 10 the next time the power is supplied, to ensure that the data were recorded.

Also, by storing the data temporarily in the memory 11, in step S3, the stored contents of the memory 11, rather than the recorded contents of the external recording unit 10, are checked for whether or not there is travel history for the same mode that is currently set, so it is possible to improve the speed and efficiency of the process.

Moreover, as long as there are data indicating the destination at the time when the automobile starts movement, it can be pre-recorded as part of the destination data OJ.

Furthermore, in regards to differentiating between normal roads and freeways when recording mid-point data of mid points, the type of road can be obtained and determined from road-type data that is stored in the map-data storage unit 6.

Also, it is possible to separate recording areas in the external recording unit 10 according to each kind of use, to make it possible to quickly find travel history for a required type of use.

Moreover, in addition to 'Private Use' and 'Business Use' as the type of use, it is possible to further classify the type of use into other types such as 'Family Trip', 'Work 1', 'Work 2', 'Customer Visit', etc.

Furthermore, in the embodiment described above, the case where the moving body was an automobile was explained, however, the invention can be applied to other cases, such as where the moving body was an aircraft, motorcycle, ship, etc.

Also, by storing a program corresponding to the flowcharts shown in FIG. 2 and FIG. 3 on a storage medium such as a flexible disk, or by storing data obtained over a network such as the Internet, and by reading and executing those by a general-purpose microcomputer, it is possible to use that microcomputer as the control unit of this embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-156180 filed on May 29, 2002 including the specification, claims, drawings and summary is incorporated herein by reference in its entirety.

What is claimed is:

1. A data-recording apparatus comprising:
    an input device which is used for entering type of use of movement of a moving object;
    a calculation device which calculates at least a distance traveled by the moving object under the entered type of use;
    a starting-point-data detecting device which detects starting-point data indicating a starting-point where the moving object starts moving;
    an ending-point-data detecting device which detects ending-point data indicating an ending-point where the moving object stops moving; and
    a recording device which records at least the calculated distance, the detected starting-point data, and the detected ending-point data on a recording medium according to the entered type of use,
    wherein the starting-point data comprises: at least one of latitude and longitude of the origin position where the moving object starts moving; a name of a road near the origin position; a name of an intersection near the origin position; and registered-point data indicating whether or not the origin position corresponds to a pre-registered point data, and
    the ending-point data comprises: at least one of latitude and longitude of the destination position where the moving object stops moving: a name of a road near the destination position; a name of an intersection near the destination position; and registered-point data indicating whether or not the destination position corresponds to a pre-registered point data.

2. The data-recording apparatus according to claim 1, wherein;
    said recording medium is a portable recording medium.

3. The data-recording apparatus according to claim 1, further comprising:
    a temporary-stop detection device which detects whether or not the recording of the calculated distance is temporarily stopped; and
    a restart-usage detection device which detects whether or not the recording is started again with the same type of use as before the temporary stop of recording, wherein
    said calculation device calculates the distance by adding a new distance to the previous calculated distance before the temporary stop of recording when said restart-usage detection device detects that the recording is started again with the same type of use as before the temporary stop.

4. The data-recording apparatus according to claim 1, further comprising:
    a temporary-stop detection device which detects whether or not the recording of the calculated distance is temporarily stopped; and
    a restart-usage detection device which detects whether or not the recording is started again with the same type of use as before the temporary stop of recording,
    wherein said calculation device calculates a new distance separate from the previous calculated distance before the temporary stop of recording when said restart-usage detection device detects that the recording is started again with the different type of use as before the temporary stop.

5. The data-recording apparatus according to claim 1, wherein;
    said recording device writes over the calculated distance on said recording medium at least once every time a preset length of time elapses.

6. The data-recording apparatus according to claim 1, wherein;
    the entered type of use is either 'Private Use' or 'Business Use'.

7. A data-recording method comprising:
    an input process which enters type of use of movement of a moving object;
    a calculation process which calculates at least a distance traveled by the moving object under the entered type of use;
    a starting-point-data detecting process which detects starting-point data indicating a starting-point where the moving object starts moving;

an ending-point-data detecting process which detects ending-point data indicating an ending-point where the moving object stops moving; and a recording process which records at least the calculated distance, the detected starting-point data, and the detected ending-point data on a recording medium according to the type of use, wherein the starting-point data comprises: at least one of latitude and longitude of the origin position where the moving object starts moving; a name of a road near the origin position; a name of an intersection near the origin position; and registered-point data indicating whether or not the origin position corresponds to a pre-registered point data, and the ending-point data comprises: at least one of latitude and longitude of the destination position where the moving object stops moving; a name of a road near the destination position; a name of an intersection near the destination position; and registered-point data indicating whether or not the destination position corresponds to a pre-registered point data.

8. A computer data signal embodied in a carrier wave and representing a sequence of instructions, which executed by a computer included in the data-recording apparatus according to claim 1, the instructions cause the computer to function as:

an input device which can be used for entering type of use of movement of a moving object;

a calculation device which calculates at least a distance traveled by the moving object under the entered type of use;

a starting-point-data detecting device which detects starting-point data indicating a starting-point where the moving object starts moving;

an ending-point-data detecting device which detects ending-point data indicating an ending-point where the moving object stops moving; and a recording device which records at least the calculated distance, the detected starting-point data, and the detected ending-point data on a recording medium according to the entered type of use, wherein the starting-point data comprises: at least one of latitude and longitude of the origin position where the moving object starts moving; a name of a road near the origin position; a name of an intersection near the origin position; and registered-point data indicating whether or not the origin position corresponds to a pre-registered point data, and the ending-point data comprises: at least one of latitude and longitude of the destination position where the moving object stops moving; a name of a road near the destination position; a name of an intersection near the destination position; and registered-point data indicating whether or not the destination position corresponds to a pre-registered point data.

9. An information recording medium in which a program for a data-recording is recorded so as to be readable by a computer included in the data-recording apparatus according to claim 1, wherein the program allows the computer to function as:

an input device which can be used for entering type of use of movement of a moving object;

a calculation device which calculates at least a distance traveled by the moving object under the entered type of use;

a starting-point-data detecting device which detects starting-point data indicating a starting-point where the moving object starts moving;

an ending-point-data detecting device which detects ending-point data indicating an ending-point where the moving object stops moving; and a recording device which records at least the calculated distance, the detected starting-point data, and the detected ending-point data on a recording medium according to the type of use, wherein the starting-point data comprises: at least one of latitude and longitude of the origin position where the moving object starts moving; a name of a road near the origin position; a name of an intersection near the origin position; and registered-point data indicating whether or not the origin position corresponds to a pre-registered point data, and the ending-point data comprises: at least one of latitude and longitude of the destination position where the moving object stops moving; a name of a road near the destination position; a name of an intersection near the destination position; and registered-point data indicating whether or not the destination position corresponds to a pre-registered point data.

* * * * *